United States Patent [19]

Kikuga et al.

[11] 4,409,374

[45] * Oct. 11, 1983

[54] COLOR DEVELOPER FOR PRESSURE-SENSITIVE COPYING PAPER

[75] Inventors: Toyoji Kikuga; Koji Hirai, both of Fujieda, Japan

[73] Assignee: Sumitomo Durez Company, Ltd., Shizuoka, Japan

[*] Notice: The portion of the term of this patent subsequent to Aug. 5, 1997 has been disclaimed.

[21] Appl. No.: 342,538

[22] Filed: Jan. 25, 1982

Related U.S. Application Data

[60] Continuation of Ser. No. 173,563, Jul. 30, 1980, abandoned, which is a division of Ser. No. 847,518, Nov. 1, 1977, Pat. No. 4,216,299.

[30] Foreign Application Priority Data

Nov. 4, 1976 [JP] Japan ................... 51-131674

[51] Int. Cl.$^3$ ............... C08L 61/06; C08L 61/10; C08L 61/14
[52] U.S. Cl. ................... 525/491; 282/27.5; 525/500; 525/501; 525/504; 525/505; 525/506

[58] Field of Search ............ 525/491, 500, 501; 282/27.5

[56] References Cited

U.S. PATENT DOCUMENTS

| | | | |
|---|---|---|---|
| 3,988,386 | 10/1976 | Hesse et al. | 525/481 |
| 4,216,299 | 8/1980 | Kikuga et al. | 525/491 |

FOREIGN PATENT DOCUMENTS

| | | | |
|---|---|---|---|
| 42-20144 | 10/1967 | Japan | 525/480 |
| 46-37451 | 11/1971 | Japan | |
| 47-20971 | 6/1972 | Japan | |
| 48-57744 | 7/1973 | Japan | |

*Primary Examiner*—Howard E. Schain
*Attorney, Agent, or Firm*—James F. Tao; James F. Mudd

[57] ABSTRACT

A color developer for pressure-sensitive copying paper is prepared by mixing a polyvalent metal salt of a para-substituted difunctional phenol-aldehyde condensate and a tri- or higher-functional phenol-aldehyde condensate and/or a polyvalent metal modified tri- or higher-functional phenol-aldehyde condensate.

43 Claims, No Drawings

COLOR DEVELOPER FOR PRESSURE-SENSITIVE COPYING PAPER

This is a continuation, of application Ser. No. 173,563, filed July 30, 1980, now abandoned, which in turn is a division of U.S. application Ser. No. 847,518, filed on Nov. 1, 1977 now U.S. Pat. No. 4,216,299.

The present invention relates to a color developer for use in a pressure-sensitive copying paper, and more particularly to an improvement in phenol-aldehyde condensate employed as such color developer.

The pressure-sensitive copying paper, or so-called carbonless copying paper, is generally based on a reaction between a colorless electron-donating organic compound (hereinafter referred to as color former) and an electron-accepting color-developing material (hereinafter referred to as color developer) capable of generating a colored product upon reaction with said color former.

The known examples of said color developer are inorganic clay materials, such as Japanese acid clay, active white clay, attapulgite, zeolite, bentonite, Kaolin etc., and phenol-aldehyde condensates such as p-substituted difunctional phenol-formaldehyde condensates. The phenol-aldehyde condensates, being superior to said inorganic clays in their ability to form a moisture-resistant colored image (developed image as well as color developing ability not being affected by the moisture in the air) upon reaction with color formers, have been commercially utilized as the color developer and have been subjected to various improvements.

In the Japanese Patent Publication Nos. Sho 42-20144 and Sho 46-37451 there is disclosed the use of p-substituted difunctional phenol-aldehyde condensates as a color developer. However, the color developers disclosed in these patent publications, through being capable of generating satisfactorily moisture-resistant image, are still associated with certain drawbacks such as (1) a still insufficient color developing ability, (2) an insufficient weathering resistance (tendency of yellowing of copying paper under direct sunlight or in indoor standing), (3) a poor oil-resistance (loss of color developing ability or fading of once developed image when the color developing sheet is smeared with gasoline, a plasticizer such as phthalic esters, or ethyl alcohol) and the like.

Further, in Japanese Patent Publication Sho 47-20971 there is disclosed the addition of a divalent metal salt such as zinc chloride to p-substituted difunctional phenol formaldehyde condensates at the preparation of coating formulation. Also in the Japanese Patent Laid-Open Sho 48-25744 there is disclosed a zinc salt or p-substituted difunctional phenol-formaldehyde condensate, or, substantially a zinc salt of p-phenylphenol-formaldehyde condensate. However, such color developers are still unable to meet all the requirements of color developing ability, weathering resistance and oil resistance, and there still exists a strong demand for the improvement of color developer in order to improve the performance of pressure-sensitive copying paper.

In accordance with this invention it has been discovered that the above-mentioned drawbacks are significantly alleviated by the use of a color developer containing a polyvalent metal salt of a p-substituted difunctional phenol-aldehyde condensate and a tri- or higher-functional phenol-aldehyde condensate and/or a polyvalent modified product of such condensate. The aforementioned p-substituted difunctional phenol is for example a p-substituted difunctional phenol wherein the p-substituent is a hydrocarbon group of 1 to 12 carbon atoms such as an alkyl or aryl group.

Despite of the fact that a tri- or higher-functional phenol-aldehyde condensate itself is scarcely provided with a color developing ability, it has been found that the addition of such tri- or higher-functional phenol-aldehyde condensate or a polyvalent metal-modified product thereof to a polyvalent metal salt of a p-substituted difunctional phenol-aldehyde condensate at the reaction or crushing thereof or at the preparation of coating composition thereof enables to significantly improve the color developing ability and oil resistance, and thus makes it possible to provide a color developer with a color developing ability, weathering resistance and oil resistance superior to those of conventionally utilized p-phenylphenol-formaldehyde condensate. Although the performance of a color developer based on a phenol-aldehyde condensate has been interpreted in terms of the color developing ability in combination with the compatibility thereof with the oil used in the microcapsules for dissolving color formers, the present invention is featured by the intentional addition, to a polyvalent metal salt of a p-substituted difunctional phenol-aldehyde condensate, of a tri- or higher-functional phenol-aldehyde or a polyvalent metal-modified product thereof which have relatively low compatibility with said oil. It is believed that the improvement in the color developing ability has been achieved, in addition to the fact that conventional phenol-aldehyde condensates have been utilized in combination with Japanese acid clay or active white clay which are not compatible with the oil, by the particular effect of the addition of a tri- or higher-functional phenol-aldehyde condensate or a polyvalent metal-modified product thereof.

The polyvalent metal salt of p-substituted difunctional phenol-aldehyde condensate to be employed in the present invention is a polyvalent metal salt of a condensate of an aldehyde with at least one member selected from p-cresol, p-ethylphenol, p-propylphenol, p-sec-butylphenol, p-tert-butyl-phenol (the foregoing p-sec.- and p-tert-butyl phenols are illustrative of phenols substituted with branched chain p-alkyl substituents), p-amylphenol, p-cyclohexylphenol, p-heptyl-phenol, p-tert-octylphenol, p-dodecylphenol, p-nonyl-phenol, p-chloro-phenol, p-bromophenol, p-phenyl-phenol, p-cumylphenol, p-phenol-sulfonic acid, p-hydroxybenzoic acid, p-hydroxybenzoic esters etc. Also included therein is a polyvalent metal salt of condensates obtained by co-condensation of above-mentioned p-substituted difunctional phenol and tri- or higher-functional phenol in limited condition, namely of said tri- or higher-functional phenol in an amount not exceeding about 0.6 moles with respect to 1 mole of said p-substituted difunctional phenol.

When considering the color of an obtained resin and the easiness of preparation, preferred among such compounds are a polyvalent metal salt of p-tert-butyl-phenol-formaldehyde condensate, a polyvalent metal salt of p-tert-octylphenol-formaldehyde condensate, a polyvalent metal salt of p-phenyl-phenol-formaldehyde condensate, and a polyvalent metal salt of a formaldehyde co-condensate of at least one member selected from p-tert-butylphenol, p-tert-octylphenol and p-phenyl-phenol and at least one member selected from phenol, bisphenol-A(4, 4'-dihydroxydiphenylpropane) and bisphenolsulfone (4, 4'-dihydroxydiphenylsulfone), among which particularly preferred are a polyvalent metal salt of p-tert-butylphenol-formaldehyde condensate and a polyvalent metal salt of p-tert-octylphenol-formaldehyde condensate. Also it is possible to employ two or more p-substituted difunctional phenols in combination. The p-substituted difunctional phenols employed in the present invention mean p-substituted phenols provided, in a molecule, with two functional carbons capable of reacting with an aldehyde.

The tri- or higher-functional phenol-aldehyde condensate or the polyvalent metal-modified product thereof to be employed in the present invention is a condensate of an aldehyde and at least one member selected from phenol, metacresol, bisphenol-A, bisphenolsulfone, resorcinol, alpha-naphthol, betanaphthol, catechol etc., or a polyvalent metal-modified product thereof. Also included therein is a condensate obtained by co-condensation of said tri- or higher-functional phenol and p-substituted difunctional phenol in a limited condition, namely of a p-substituted difunctional phenol in an amount not exceeding about 0.1 moles with respect to 1 mole of said tri- or higher-functional phenol, or a polyvalent metal-modified product thereof. Among such compounds preferred are phenol-formaldehyde condensate or a polyvalent metal-modified product thereof, bisphenol-A-formaldehyde condensate or a polyvalent metal-modified product thereof, bisphenolsulfoneformaldehyde condensate or a polyvalent metal-modified product thereof, and co-condensates thereof or a polyvalent metal-modified products thereof.

The tri- or higher-functional phenols employed in the present invention mean phenols provided, in a molecule, with three or more functional carbons capable of reacting with an aldehyde.

The examples of aldehyde to be employed in the present invention are formaldehyde (formalin, paraformaldehyde), acetaldehyde and butyraldehyde, among which preferred is formaldehyde. Generally the aldehydes contain 1 to 8 carbon atoms.

The examples of acidic catalyst to be employed in the present invention are inorganic or organic acids such as hydrochloric acid, sulfuric acid, phosphoric acid, oxalic acid, acetic acid, formic acid, p-toluenesulfonic acid, benzenesulfonic acid, phenolsulfonic acid, and the like, among which preferred are hydrochloric acid and oxalic acid when considering of the color of obtained condensate.

The examples of metal salt to be employed in the present invention for obtaining the polyvalent metal salt of p-substituted difunctional phenol-aldehyde condensate or the polyvalent metal-modified product of tri- or higher-functional phenol-aldehyde condensate are chloride, sulfate, nitrate, formate, acetate, benzoate, hydroxybenzoate, salicylate, borate, phosphate etc. of a polyvalent metal such as zinc, magnesium, tin, cadmium, aluminum, lead, titanium, calcium, cobalt, iron, nickel or manganese, among which preferred are salts of zinc, aluminum, calcium and magnesium when considering the color of obtained condensate. When a polyvalent metal-modified product of a tri- or higher-functional phenol-aldehyde condensate is used in combination with the polyvalent metal salt of p-substituted difunctional phenol-aldehyde condensate, it is preferable that these two compounds are based on the same metal, though it is not essential.

In the following there will be given a detailed explanation on the method of preparation of the color developer of the present invention.

(1) Preparation of the polyvalent metal salt of p-substituted difunctional phenol-aldehyde condensate (1)-1 Preparation of condensate (a) At least one p-substituted difunctional phenol and an aldehyde are subjected to condensation reaction in the presence of an acidic catalyst and with or without the addition of an organic solvent such as benzene, toluene, xylene or trichloroethylene, followed by elimination of water and solvent to obtain a condensate.

(b) At least one p-substituted difunctional phenol and an aldehyde are subjected to resol reaction firstly in the presence of an alkaline catalyst such as sodium hydroxide, potassium hydroxide, calcium hydroxide or barium hydroxide, then acidified to a pH of 4–6 with sulfuric acid, phosphoric acid, hydrochloric acid or oxalic acid, and, eventually, if necessary, after elimination of salt resulting from neutralization by means of washing with water, subjected to novolac condensation reaction in the presence or absence of an acidic catalyst, followed by elimination of water and solvent to obtain a condensate.

(c) Further, a p-substituted difunctional phenol and a tri- or higher-functional phenol along with aldehyde are subjected to co-condensation within the restricted ratio of phenols to obtain a condensate. In the preparation of a condensate according to the above (a), (b), or (c), the aldehyde is preferably employed in an amount of about 0.5–0.9 moles with respect to 1 mole of p-substituted difunctional phenol (inclusive of tri- or higher-functional phenol in case of a co-condensation).

(1)-2 Preparation of polyvalent metal salt of condensate The condensate obtained according to (a), (b) or (c) in the above (1)-1 is added with a suitable amount of an alkaline material such as ammonium carbonate or sodium hydroxide and a polyvalent metal salt such as zinc dibenzoate or zinc acetate, and the resulting mixture is reacted at a temperature of 150°–200° C. to obtain a polyvalent metal salt of condensate adapted for use in the present invention.

Otherwise the condensate obtained according to (a), (b) or (c) in the above (1)-1 is dissolved or dispersed in an alkaline material such as sodium hydroxide, and the resulting solution is added with a suitable amount of a polyvalent metal salt such as zinc chloride or aluminum chloride to obtain a polyvalent metal salt of condensate adapted for use in the present invention. The polyvalent metal salt of p-substituted difunctional phenol-aldehyde condensate employed in the present invention contains a metal preferably in an amount of about 1 to 10 wt. %.

(2) Preparation of tri- or higher-functional phenol-aldehyde condensate (d) At least one tri- or higher-functional phenol and an aldehyde are subjected to condensation reaction in the presence of an acidic catalyst, followed by elimination of water to obtain a condensate adapted for use in the present invention.

(e) At least one tri- or higher-functional phenol and an aldehyde are subjected to resol reaction firstly in the presence of an alkaline catalyst, then acidified to a pH of 4–6, and, eventually, if required, after elimination of salt resulting from neutralization by means of washing with water, subjected to novolac condensation reaction in the presence or absence of an acidic catalyst, followed by elimination of water to obtain a condensate adapted for use in the present invention.

(f) Said condensates also include those obtained by co-condensation of a tri- or higher-functional phenol and a p-substituted difunctional phenol with an aldehyde under a limited condition.

In the preparation of condensates according to the above (d), (e) or (f), the aldehyde is preferably in an amount of about 0.4-0.85 moles with respect to 1 mole of tri- or higher-functional phenol (inclusive of p-substituted difunctional phenol in case of co-condensation).

(3) Preparation of polyvalent metal-modified product of tri- or higher-functional phenol-aldehyde condensate To the tri- or higher-functional phenol-aldehyde condensate prepared according to the above (d), (e) or (f) is added a suitable amount of an alkaline material such as ammonium carbonate or sodium hydroxide and a polyvalent metal salt such as zinc dibenzoate or zinc acetate, and the resulting mixture is reacted at a temperature of about 150°-200° C. to obtain a condensate modified by a polyvalent metal adapted for use in the present invention.

Otherwise the tri- or higher-functional phenol-aldehyde condensate prepared according to the above (d), (e) or (f) is dissolved or dispersed in an alkaline material such as sodium hydroxide, and to the resulting solution is gradually added a suitable amount of a polyvalent metal salt such as zinc chloride or aluminum chloride to obtain a condensate modified by a polyvalent metal salt adapted for use in the present invention.

The metal-modified condensate employed in the present invention contains a metal, preferably in an amount within a range of about 1-10 wt. %.

(4) Preparation of the color developer of the present invention

The color developer of the present invention comprises at least one polyvalent metal salt of said p-substituted difunctional phenol-aldehyde condensate and at least one tri- or higher-functional phenol-aldehyde condensate and/or a polyvalent metal-modified product thereof, and can be prepared either by adding said tri- or higher-functional phenol-aldehyde condensate or a polyvalent metal-modified product thereof in a molten state to said polyvalent metal salt of p-substituted difunctional phenol-aldehyde condensate during or after the preparation thereof, or by adding said polyvalent metal salt of p-substituted difunctional phenol-aldehyde condensate in a molten state to said tri- or higher-functional phenol-aldehyde condensate or the polyvalent metal-modified product thereof during or after the preparation thereof.

The color developer of the present invention can further be obtained by mixing said polyvalent metal salt of p-substituted difunctional phenol-aldehyde condensate and said tri- or higher-functional phenol-aldehyde condensate or polyvalent metal-modified product thereof during the crushing step thereof, or by mixing solutions or dispersions in which said compounds are respectively dissolved or dispersed together with a surfactant or a dispersant.

Furthermore, also included in the present invention is the preparation of a color developer by separately adding said compounds to the coating solution for coating the color developing sheet.

The color developer thus obtained is provided, in comparison with the conventional color developers, with an improved color developing ability (higher color intensity and faster color developing speed) in combination with an excellent weathering resistance and oil resistance.

More specifically, in comparison with the p-phenylphenol-formaldehyde condensate which represents a major portion of currently employed color developer based on p-substituted difunctional phenols, the color developer of the present invention is far superior in the color developing ability, weathering resistance and oil resistance. The present inventors consider that the improvement in the color developing ability is achieved by a particular effect of the tri- or higher-functional phenol-aldehyde condensate or the polyvalent metal-modified product thereof in combination with an inorganic color developer such as Japanese acid clay or active white clay.

Also the improvement in the oil resistance is presumably based on the introduction of tri- or higher-functional phenol-aldehyde condensate or polyvalent metal-modified product thereof which themselves are oil resistant.

Said improvement in the oil resistance resolves the troubles frequently encountered when a pressure-sensitive copying paper is placed in contact with a plastic film containing a plasticizer or with gasoline.

Thus, the present invention provides a possibility for novel applications through the improvement in the oil resistance, and also enables, through the improvement in the color developing ability, to reduce the coating amount of color developer necessary for obtaining the same color intensity thus leading to the cost reduction of pressure-sensitive copying paper.

The color developer of the present invention should naturally be employed in combination with an inorganic color developer such as Japanese acid clay, active white clay or Kaolin, and it can also be used in combination with inorganic pigments.

The advantages of the color developer of the present invention will be further clarified in the following non-limitative examples, in which the quantities are represented by parts by weight and percentages by weight unless otherwise specified.

EXAMPLE A

500 Parts of p-phenylphenol, 143 parts of 37% formalin, 5 parts of oxalic acid and 200 parts of xylene were placed in a reactor and reacted for 4 hours under reflux. After the elimination of water and solvent, the reaction mixture was heated to 170° C., and 37 parts of ammonium bicarbonate ($NH_4HCO_3$) and 62 parts of zinc dibenzoate were added in small portions to obtain a zinc salt (A) of condensate.

EXAMPLE B

500 Parts of p-phenylphenol, 143 parts of 37% formalin, 5 parts of oxalic acid and 200 parts of xylene were placed in a reactor and reacted for 4 hours under reflux. After the elimination of water and solvent, the reaction mixture was heated to 130° C. to obtain a condensate (B).

EXAMPLE C

350 Parts of p-tert-butylphenol, 150 parts of p-tert-octylphenol, 199 parts of 37% formalin, 2 parts of concentrated (35.5%) hydrochloric acid and 150 parts of xylene were placed in a reactor and reacted for 5 hours under reflux. After the elimination of water and solvent, the reaction mixture was heated to 140° C., then dissolved in 1,000 parts of 5.9% aqueous solution of sodium hydroxide and 116 parts of aluminum chloride ($AlCl_3.6H_2O$) were added in small portions to obtain a precipitate, which was collected by filtration, washed with water and air-dried to obtain an aluminum salt of condensate (C).

EXAMPLE D

The condensate obtained in Example C was dissolved in 1,000 parts of 1.7% aqueous solution of sodium hydroxide, and 28 parts of zinc chloride (ZnCl₂) were added in small portions to obtain a precipitate, which was collected by filtration, washed with water and air-dried to obtain a zinc salt of condensate (D).

EXAMPLE E

350 Parts of p-tert-butylphenol, 150 parts of p-tert-octylphenol, 199 parts of 37% formalin, 2 parts of concentrated hydrochloric acid and 150 parts of xylene were placed in a reactor and reacted for 5 hours under reflux. After the elimination of water and solvent, the reaction mixture was heated to 170° C. and 37 parts of ammonium bicarbonate and 44 parts of zinc acetate (CH₃COOZnCOOCH₃.2H₂O) were added in small portions to obtain a zinc salt of condensate (E).

EXAMPLE F

375 Parts of p-tert-octylphenol, 75 parts of phenol, 50 parts of bisphenol-A, 196 parts of 37% formalin, 10 parts of oxalic acid and 100 parts of xylene were placed in a reactor and reacted for 7 hours under reflux. After the elimination of water and solvent, the reaction mixture was heated to 170° C. and added with 37 parts of ammonium bicarbonate and 44 parts of zinc acetate in small portions to obtain a zinc salt of condensate (F).

EXAMPLE G

The process of the Example F was repeated with 73 parts of ammonium bicarbonate and 88 parts of zinc acetate to obtain a zinc salt of condensate (G).

EXAMPLE H

The process of Example F was repeated with 109 parts of ammonium bicarbonate and 132 parts of zinc acetate to obtain a zinc salt of condensate (H).

EXAMPLE I

500 Parts of phenol, 341 parts of 37% formalin and 1 part of concentrated hydrochloric acid were placed in a reactor and reacted for 3 hours under reflux. After the elimination of water, the reaction mixture was heated to 180° C. to obtain a condensate (I).

EXAMPLE J

500 Parts of bisphenol-A, 124 parts of 37% formalin, 1 part of concentrated hydrochloric acid and 150 parts of xylene were placed in a reactor and reacted for 3 hours under reflux. After the elimination of water and solvent, the reaction mixture was heated to 130° C. to obtain a condensate (J).

EXAMPLE K

500 Parts of bisphenolsulfone (product of Nikka Kagaku Kogyo Co.), 124 parts of 37% formalin, 50 parts of 20% aqueous solution of sodium hydroxide and 200 parts of water were placed in a reactor and reacted for 4 hours under reflux. After acidifying with concentrated sulfuric acid to pH 4-6, to the reaction mixture was added 1 part of concentrated hydrochloric acid, then reacted for 1 hour under reflux, subjected to elimination of water and heated to 150° C. to obtain a condensate (K).

EXAMPLE L

475 Parts of bisphenol-A, 25 parts of p-tert-octylphenol, 107 parts of 37% formalin, 2 parts of concentraated hydrochloric acid and 250 parts of xylene were placed in a reactor and reacted for 6 hours under reflux. After the elimination of water and solvent, the reaction mixture was heated to 130° C. to obtain a condensate (L).

EXAMPLE M

500 Parts of the condensate (I) obtained in the Example I were heated to 170° C. in a reactor and 73 parts of ammonium bicarbonate and 88 parts of zinc acetate were added gradually to obtain a zinc-modified condensate (M).

The following Table 1 summarizes the performance of the color developers of the present invention (Example 1 to 11) containing a polyvalent metal salt of p-substituted difunctional phenol-aldehyde condensate and a tri- or higher-functional phenol-aldehyde condensate and/or a polyvalent metal-modified product thereof, as well as that of Reference Examples 1 to 5.

TABLE 1

| | Color developer composition | | | | Performance[1] | | |
|---|---|---|---|---|---|---|---|
| | p-Substituted difunctional phenol-aldehyde condensate polyvalent metal salt | parts | Tri- or higher-functional phenol-aldehyde condensate modified by polyvalent metal | parts | Color developing ability | Weathering resistance | Oil resistance |
| Example 1 | Condensate A | 100 | Condensate J | 50 | 53 | 90 | *** |
| Example 2 | Condensate A | 100 | Condensate J | 100 | 55 | 94 | *** |
| Example 3 | Condensate A | 100 | Condensate J | 150 | 57 | 95 | *** |
| Example 4 | Condensate A | 100 | Condensate L | 100 | 54 | 95 | *** |
| Ref. Ex. 1 | Condensate A | 100 | — | — | 58 | 87 | ** |
| Ref. Ex. 2 | Condensate B | 100 | — | — | 61 | 85 | * |
| Ref. Ex. 3 | — | — | Condensate J | 100 | 85 | 95 | — |
| Example 5 | Condensate C | 100 | Condensate I | 50 | 64 | 87 | *** |
| Example 6 | Condensate D | 100 | Condensate I | 50 | 61 | 87 | *** |
| Example 7 | Condensate E | 100 | Condensate I | 50 | 60 | 88 | *** |
| Example 8 | Condensate E | 100 | Condensate M | 50 | 58 | 89 | *** |
| Ref. Ex. 4 | Condensate E | 100 | — | — | 69 | 90 | * |
| Example 9 | Condensate F | 100 | Condensate K | 50 | 59 | 88 | *** |
| Example 10 | Condensate G | 100 | Condensate K | 50 | 57 | 90 | *** |
| Example 11 | Condensate H | 100 | Condensate K | 50 | 55 | 90 | *** |

TABLE 1-continued

| | Color developer composition | | | | Performance[1] | | |
|---|---|---|---|---|---|---|---|
| | p-Substituted difunctional phenol-aldehyde condensate polyvalent metal salt | parts | Tri- or higher-functional phenol-aldehyde condensate modified by polyvalent metal | parts | Color developing ability | Weathering resistance | Oil resistance |
| Ref. Ex. 5 | Condensate G | 100 | — | — | 69 | 92 | ** |

[1]Explained in end of specificatiion

From the foregoing results it will be understood that the color developing ability, weathering resistance and oil resistance are well balanced in every Example. More specifically in comparison with the Reference Example 2 representing p-phenylphenol-formaldehyde condensate currently employed as the color developer or with the Reference Example 1 which is a polyvalent metal salt thereof, every Example 1, 2, 3 and 4 is superior in all the properties. Also in comparison with the Reference Examples 4 and 5 which are polyvalent metal salts of condensates of p-tert-butylphenol or p-tert-octylphenol (alkylphenols) and formaldehyde and which are inferior in the color developing ability and in the oil resistance, each Example 7, 8, 9, 10 and 11 shows improved color developing ability and improved oil resistance.

Test Methods

1. Preparation of coating composition and of color developing sheet

A mixture consisting of 40 parts of a color developer obtained in either of the foregoing Examples and Reference Examples, 2 parts of an anionic surfactant and 58 parts of water was subjected to wet crushing in the Attriter to obtain an emulsion in which the color developer is dispersed with a particle size not exceeding 5 microns. The emulsion thus obtained was blended with the following components to obtain a coating composition:

| Preparation of coating composition | |
|---|---|
| Emulsion of color developer | 6.3 parts |
| Kaolin clay | 20.4 |
| Silica gel | 0.9 |
| Calcium carbonate | 2.8 |
| Styrene-butadiene latex | 4.1 |
| Starch binder | 2.8 |
| Water | 62.7 |

The coating composition thus prepared was coated with a coating rod onto a sheet of paper with a dried weight of 5 g/m². The obtained color developing sheet was air-dried for 1 day and used for various tests.

Performance Test Methods (a) Color developing ability: A paper sheet coated with microcapsules containing crystal violet lactone was superposed on the abovementioned color developing sheet, and the color was generated by applying a pressure of 500 kg/cm². After 1 hour, the color density was measured with a reflectance densitometer (Nippon Denshoku Co.). The figures in the foregoing table represent reflectance (%). Thus, the color intensity becomes higher as the measured figure becomes lower.

(b) Weathering resistance: Reflectance of a color developing sheet was measured with a reflectance densitometer before and after said sheet was exposed to sunlight for 10 hours. The weathering resistance was calculated from the following equation:

$$\text{Weathering resistance} = \frac{\text{reflectance after exposure}}{\text{reflectance before exposure}} \times 100$$

Thus, the weathering resistance becomes improved as the figure becomes higher.

(c) Oil resistance: A color developing sheet on which a color was generated was immersed, 24 hours after the color generation, in gasoline for 1 second, and the change in color was evaluated in the following manner:

---

\*\*\* no change in color
\*\* color faded partly
\* color faded completely

---

We claim:

1. A color developer for pressure-sensitive copying paper which comprises:
   (1) a polyvalent metal salt of a para-substituted difunctional phenol-aldehyde condensate, and
   (2) a tri- or higher-functional phenol-aldehyde condensate, a polyvalent metal-modified product thereof or a mixture of said condensate and said metal modified product.

2. A color developer according to claim 1 wherein the aldehyde is formaldehyde.

3. A color developer according to claim 2 wherein the para substituent of said para-substituted difunctional phenol is a hydrocarbon substituent of 1 to 12 carbon atoms.

4. A color developer according to claim 3 wherein said hydrocarbon substituent is an aryl substituent.

5. A color developer according to claim 4 wherein said aryl substituent is the phenyl group.

6. A color developer according to claim 3 wherein said hydrocarbon substituent is an alkyl substituent.

7. A color developer according to claim 6 wherein said alkyl substituent is a branched chain alkyl substituent.

8. A color developer according to claim 7 wherein the branched chain alkyl substituent is the tertiary butyl group.

9. A color developer according to claim 7 wherein the branched chain alkyl substituent is the tertiary octyl group.

10. A color developer according to claim 1 wherein said polyvalent metal salt of a para-substituted difunctional phenol-aldehyde condensate is a polyvalent metal salt of a condensate obtained by condensation with an aldehyde of at least one para-substituted difunctional phenol and a tri- or higher functional phenol in an amount not exceeding about 0.6 moles with respect to 1 mole of said para-substituted difunctional phenol.

11. A color developer according to claim 10 wherein the aldehyde is formaldehyde.

12. A color developer according to claim 11 wherein the para-substituent of said para-substituted difunctional phenol is a hydrocarbon substituent of 1 to 12 carbon atoms.

13. A color developer according to claim 12 wherein said hydrocarbon substituent is an aryl substituent.

14. A color developer according to claim 13 wherein said aryl substituent is the phenyl group.

15. A color developer according to claim 12 wherein said hydrocarbon substituent is an alkyl substituent.

16. A color developer according to claim 15 wherein said alkyl substituent is a branched chain alkyl substituent.

17. A color developer according to claim 16 wherein the branched chain alkyl substituent is the tertiary butyl group.

18. A color developer according to claim 16 wherein the branched chain alkyl substituent is the tertiary octyl group.

19. A color developer according to claim 1 wherein (2) comprises the tri- or higher functional phenol-aldehyde condensate.

20. A color developer according to claim 19 wherein the aldehyde is formaldehyde.

21. A color developer according to claim 20 wherein the tri- or higher functional phenol is phenol.

22. A color developer according to claim 20 wherein the tri- or higher functional phenol is bisphenol-A.

23. A color developer according to claim 20 wherein the tri- or higher functional phenol is bisphenol sulfone.

24. A color developer according to claim 1 wherein (2) comprises a polyvalent metal-modified product of the condensate of a tri- or higher functional phenol and an aldehyde.

25. A color developer according to claim 24 wherein the aldehyde is formaldehyde.

26. A color developer according to claim 25 wherein the tri- or higher functional phenol is phenol.

27. A color developer according to claim 25 wherein the tri- or higher functional phenol is bisphenol-A.

28. A color developer according to claim 25 wherein the tri- or higher functional phenol is bisphenol sulfone.

29. A color developer according to claim 1 wherein the condensate of (2) is a cocondensate obtained by condensation with an aldehyde or at least one tri- or higher functional phenol and a para-substituted difunctional phenol, the amount of said para-substituted difunctional phenol not exceeding about 0.1 mole per mole of said tri- or higher functional phenol.

30. A color developer according to claim 29 wherein the aldehyde is formaldehyde.

31. A color developer according to claim 30 wherein the tri- or higher functional phenol is phenol.

32. A color developer according to claim 30 wherein the tri- or higher functional phenol is bisphenol-A.

33. A color developer according to claim 30 wherein the tri- or higher functional phenol is bisphenol sulfone.

34. A color developer according to claim 1 wherein the weight ratio of the para-substituted difunctional phenol-aldehyde condensate of (1) to (2) is in the range of about 1:0.1 to 1:2.

35. A color developer according to claim 34 wherein the aldehyde is formaldehyde.

36. A color developer according to claim 1 wherein the polyvalent metal salt of (1) is provided with a metal content within a range of from about 1 to 10 weight percent.

37. A color developer according to claim 36 wherein the polyvalent metal salt of (1) is a salt of zinc.

38. A color developer according to claim 36 wherein the polyvalent metal salt of (1) is a salt of calcium.

39. A color developer according to claim 36 wherein the polyvalent metal salt of (1) is a salt of aluminum.

40. A color developer according to claim 1 wherein the polyvalent metal-modified product of (2) is provided with a metal content within a range of from about 1 to 10 weight percent.

41. A color developer according to claim 40 wherein the polyvalent metal-modified product of (2) is a salt of zinc.

42. A color developer according to claim 40 wherein the polyvalent metal-modified product of (2) is a salt of calcium.

43. A color developer according to claim 40 wherein the polyvalent metal-modified product of (2) is a salt of aluminum.

* * * * *